(12) United States Patent
Blaser et al.

(10) Patent No.: US 9,719,614 B2
(45) Date of Patent: Aug. 1, 2017

(54) CABLE CONTACT WEATHER PROTECTION DEVICE

(71) Applicant: Reichle & De-Massari AG, Wetzikon (CH)

(72) Inventors: Mathias Blaser, Zurich (CH); Hans Winterhoff, Waldshut-Tiengen (DE); Michael Keiser, Uster (CH)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 14/653,331

(22) PCT Filed: Dec. 9, 2013

(86) PCT No.: PCT/EP2013/075969
§ 371 (c)(1),
(2) Date: Jun. 18, 2015

(87) PCT Pub. No.: WO2014/095462
PCT Pub. Date: Jun. 26, 2014

(65) Prior Publication Data
US 2015/0345668 A1 Dec. 3, 2015

(30) Foreign Application Priority Data
Dec. 18, 2012 (DE) .................. 10 2012 112 510

(51) Int. Cl.
*F16L 5/02* (2006.01)
*G02B 6/44* (2006.01)

(52) U.S. Cl.
CPC .............. *F16L 5/02* (2013.01); *G02B 6/4444* (2013.01)

(58) Field of Classification Search
None
See application file for complete search history.

(56) References Cited

U.S. PATENT DOCUMENTS 4,034,944 A * 7/1977 Moran ................. H02G 3/0625
174/153 G
4,892,116 A * 1/1990 Grasseschi ............. E03C 1/042
137/359

(Continued)

FOREIGN PATENT DOCUMENTS

DE 7330447 U 11/1973
DE 43 33 067 C1 3/1995

(Continued)

OTHER PUBLICATIONS

European Office Action dated Jan. 21, 2016 in the corresponding EP application 15 161 164.7( English translation attached).

(Continued)

*Primary Examiner* — Jeremy C Norris
*Assistant Examiner* — Muhammed Azam
(74) *Attorney, Agent, or Firm* — Posz Law Group, PLC (57) ABSTRACT

The invention relates to a cable contact weather protection device for receiving cable contact points, in particular of fiber optic cable contact points, with at least one cable pass-through sealing unit comprising at least two separate sealing modules, which are exchangeable independently from each other and each of which is provided to at least sectionally completely encompass, in at least one usage state, at least one elongate body in a circumferential direction.

20 Claims, 9 Drawing Sheets

(56) References Cited

U.S. PATENT DOCUMENTS

| | | | |
|---|---|---|---|
| 5,517,592 | A | 5/1996 | Grajewski et al. |
| 5,775,702 | A | 7/1998 | Laeremans et al. |
| 7,689,090 | B2 * | 3/2010 | Kluwe ................. G02B 6/4444 385/134 |
| 2002/0027325 | A1 * | 3/2002 | Kogler ..................... F16L 5/10 277/315 |
| 2002/0064303 | A1 * | 5/2002 | Fuss ................... H04N 1/00838 382/135 |
| 2002/0177351 | A1 | 11/2002 | Kihira et al. |
| 2003/0019163 | A1 * | 1/2003 | Dittel ........................ E03F 5/02 52/20 |
| 2003/0178787 | A1 * | 9/2003 | Christie ................. F16J 15/025 277/549 |
| 2004/0080119 | A1 | 4/2004 | Goll |
| 2004/0100028 | A1 | 5/2004 | Desard et al. |
| 2006/0285810 | A1 * | 12/2006 | Vanhentenrijk ...... G02B 6/4444 385/135 |
| 2008/0224419 | A1 * | 9/2008 | Mullaney .................. F16L 5/08 277/602 |
| 2009/0057008 | A1 * | 3/2009 | Knorr ................. G02B 6/4444 174/652 |
| 2009/0309313 | A1 * | 12/2009 | Knorr ................. G02B 6/4444 277/626 |
| 2009/0315273 | A1 * | 12/2009 | Johansson ................. F16L 5/08 277/606 |
| 2013/0014974 | A1 | 1/2013 | Burke et al. |
| 2013/0161262 | A1 * | 6/2013 | Henley ..................... C02F 9/00 210/695 |
| 2014/0199035 | A1 * | 7/2014 | Bunte ...................... G02B 6/44 385/100 |
| 2014/0227894 | A1 * | 8/2014 | Schweizer ......... H01R 13/6461 439/131 |

FOREIGN PATENT DOCUMENTS

| | | |
|---|---|---|
| DE | 102 22 654 A1 | 11/2002 |
| DE | 20 2006 006 019 U1 | 7/2006 |
| DE | 20 2007 014 371 U1 | 1/2008 |
| DE | 10 2010 045 147 A1 | 3/2012 |
| EP | 0316911 A2 | 5/1989 |
| EP | 0 650 239 A1 | 10/1994 |
| EP | 0 841 734 A1 | 5/1998 |
| EP | 2 365 367 A1 | 9/2011 |
| EP | 2 198 335 B1 | 6/2012 |
| EP | 2 365 367 B1 | 11/2012 |
| WO | 90/05401 A1 | 5/1990 |
| WO | 02/097488 A2 | 12/2002 |
| WO | 2008/112118 A2 | 9/2008 |

OTHER PUBLICATIONS

Search Report dated Jul. 22, 2013 issued in corresponding DE patent application No. 10 2012 112 510.4 (and partial English translation).
International Search Report and Written Opinion of the International Searching Authority dated Apr. 16, 2014 issued in corresponding International Application No. PCT/EP2013/075969.
International Preliminary Report on Patentability dated Jun. 23, 2015 issued in corresponding International Application No. PCT/EP2013/075969.
Office Action issued Oct. 8, 2015 in the corresponding EP application No. 15161164.7 (with partial English translation).
European Search Report issued Sep. 2, 2015 in the corresponding EP application No. 15161164.7 (with partial English translation).
Office Action dated May 25, 2016 issued in corresponding EP patent application No. 15 161 164.7(and partial English translation).

* cited by examiner

CABLE CONTACT WEATHER PROTECTION DEVICE

CROSS REFERENCE TO RELATED APPLICATIONS

This application is a U.S. national stage application of PCT/EP2013/075969 filed on Dec. 9, 2013, which is based on German Patent Application No. 10 2012 112 510.4 filed on Dec. 18, 2012, the contents of which are incorporated herein by reference.

STATE OF THE ART

The invention relates to a cable contact weather protection device according to claim 1.

It has already been proposed that a cable contact weather protection device for receiving cable contact points of fiber optic cables is provided with sealing elements, to the purpose of sealing off cable pass-through openings.

The objective of the invention is in particular to provide a system and/or a cable contact device with improved characteristics regarding a high flexibility, easy maintenance and/or low cost. The objective is achieved, according to the invention, by the features of patent claim 1, while advantageous implementations and further developments of the invention may be gathered from the subclaims.

ADVANTAGES OF THE INVENTION

The invention is based on a cable contact weather protection device for receiving cable contact points, in particular fiber optic cable contact points, with at least one cable pass-through sealing unit comprising at least two, in particular at least four, advantageously at least six, preferably at least eight separate sealing modules, which are exchangeable independently from each other and each of which is provided to encompass, in at least one usage state, at least one elongate body at least sectionally in a longitudinal direction and completely in a circumferential direction. A "cable contact weather protection device" is to be understood, in particular, as a device provided to receive and/or to form a contacting arrangement for connecting cables, in particular fiber optic cables, and/or for holding connection points between cables, in particular fiber optic cables, in such a way that they are protected against the weather. In particular, the cable contact weather protection device is provided to be used in unprotected environments, in particular outdoors, in the ground, in mounting shafts, at cable pylons and/or in comparable places.

In particular, the cable contact weather protection device protects cable contact points at least from humidity, in particular in case of a cable shaft and/or mounting shaft filling up with water. In particular, the cable contact weather protection device comprises at least one housing unit, which is provided to form a hollow space in which the cable contact points are arranged at least in an assembled state. "Cable contact points" are to be understood, in particular, as technical connections between lines of a cable and/or of two different cables, allowing in particular a signal transfer. A "cable pass-through sealing unit" is to be understood, in particular, as a unit that is provided to seal off cable pass-through regions of the housing unit. In particular, the sealing modules are provided to be arranged in cable pass-through regions of the housing unit. In particular, each of the sealing modules respectively forms at least one, in particular at least three, in particular at least six, in particular at least ten, in particular at least sixteen cable pass-through channels, which are respectively provided to receive and/or to tightly encompass circumferentially, in at least one usage state, respectively at least one, preferably respectively precisely one, elongate object. In particular, the cable pass-through channels have a length that is at least as large, in particular at least twice as large, advantageously at least three times as large as a diameter of the cable pass-through channel. In particular, the cable pass-through channel has a length of at least 2 cm, advantageously at least 3.5 cm, preferably at least 5 cm, and/or of maximally 10 cm, in particular no more than 8 cm, advantageously no more than 6 cm. In particular, the cable pass-through sealing unit comprises at least one sealing module carrier, which is provided to carry, in at least one usage state, at least two, advantageously at least a majority, preferably each of the sealing modules. In particular, the cable pass-through sealing unit comprises at least one sealing surface, which is adjacent to a structural element of the housing unit in at least one usage state. By a "sealing module" is to be understood, in particular, a structural unit that can be exchanged for a sealing module of the same or a different construction type, in particular for an adaptation to different cable configurations with in particular different numbers of cables and/or cable diameters. In particular, the sealing modules are disconnectable from and/or connectable to, in particular, the sealing module carrier without a tool and/or by means of most simple tools, in particular merely a screwdriver. By "separate" sealing modules in particular sealing modules are to be understood which differ from such sealing modules that share structural elements. In particular, separate sealing modules do not share any structural elements. In particular, separate sealing modules are implemented such that they are independently from each other disconnectable and/or connectable, in particular with respect to the sealing module carrier. In particular, the sealing modules are disconnectable, connectable and/or exchangeable with respect to the cable pass-through sealing unit individually and independently from each other, in particular without having an impact on a position of further sealing modules. In particular, the sealing modules each comprise at least one sealing element and at least one sheathing element adjacent to the respective sealing element. In particular, the sheathing element is provided for a stabilization of the sealing element. In particular, the sealing module comprises a sheathing element respectively at ends of the sealing module, out of which protrudes an encompassed elongate body, in particular a cable. An "elongate body" is to be understood, in particular, as a body having a length that is at least twice, advantageously at least four times, preferably at least eight times as large as its diameter measured in particular transversely with respect to the length. In particular, implementations of the elongate body as a tube, in particular as a sparger tube, as a cable, in particular as a fiber optic cable, and/or as a blind plug are conceivable. "Provided" is to mean, in particular, specifically programmed, designed and/or equipped. By an object being provided for a certain function is to be understood, in particular, that the object fulfills and/or executes this certain function in at least one usage state and/or operation state.

By the implementation according to the invention in particular an easy maintenance, a cost reduction, a high flexibility and/or an improved sealing effect can be achieved.

It is further proposed that the cable contact weather protection device comprises a pressurizing unit, which is provided to charge the sealing modules with a pressure in at least one direction. In particular, the pressurizing unit is provided to charge the sealing modules with a pressure in directions which are at least substantially parallel to cable pass-through channels of the respective sealing modules. In particular, the pressurizing unit is embodied at least partially in a one-part implementation with a sealing module carrier of the cable pass-through sealing unit. In particular, parts of the sealing module carrier are also parts of the pressurizing unit. In particular, an improved sealing effect can be achieved. In particular, a deformation of the respective sealing module, in particular at least of the respective sealing element, can be achieved, resulting in a necking of the cable pass-through channels formed by the sealing modules respectively by their sealing elements.

It is furthermore proposed that the pressurizing unit comprises for at least a majority, in particular at least 30%, advantageously at least 45%, especially advantageously at least 60%, preferably each of the sealing modules of the cable pass-through sealing unit respectively one separate pressurizing module. In particular, separate pressurizing modules are provided to charge respectively one individual sealing module with a pressure. In particular, the pressurizing modules share a pressure base. In particular, the pressurizing modules each comprise a respective actuating body, which is provided to receive the pressure and to transfer it to the respective sealing module, the sealing module being advantageously arranged between the pressure base and the actuating body. Preferably the adjusting bodies of different pressurizing modules are supported such that they are movable with respect to each other. In particular, each of the pressurizing modules comprises its own tension force unit, which is provided to keep up and/or to generate the pressure for pressurizing the respective sealing module. In particular, the pressurizing modules charge the sealing modules independently from each other with in particular different pressures, which are in particular dependent on a cable occupancy of the sealing modules. A simplified construction and/or an improved sealing effect may in particular be achieved. In particular, it can be achieved that sealing modules which have comparable cable pass-through channels but are occupied by cables with different cable diameters are deformed in different grades, to the purpose of respectively achieving a good sealing effect. As an alternative, it is conceivable that the sealing modules are charged with pressure by means of a single pressurizing module.

Furthermore, it is proposed that the pressurizing unit comprises at least one, in particular precisely one pressure adjusting unit, which is provided to simultaneously adjust a pressure for at least a majority, in particular at least 25%, advantageously at least 50%, especially advantageously at least 75%, preferentially each of the pressurizing modules. In particular, the pressure adjusting unit comprises at least one operating element, in particular a screwing element, as an alternative a leverage element, which is provided to adjust the pressures by changing a position. In particular, the pressurizing unit comprises at least one main actuating body, which is provided to simultaneously pre-bias the tension force units of the pressurizing modules by changing a position and to thus adjust the pressures exerted on the sealing modules, and which changes its position in particular by the operating element being operated, wherein the adjusting element in particular receives a total of the tension forces of the tension force units of the pressurizing modules. In particular, the main actuating body is provided to be adjusted with respect to another component of the pressure adjusting unit by a maximum length of at least 1 cm, in particular at least 2 cm, and/or maximally 5 cm, in particular no more than 3 cm, in at least one operating state. In particular, easy handling is achievable. In particular, an efficient sealing process is achievable.

Moreover it is proposed that at least two of the sealing modules are embodied differently. By the sealing modules being embodied "differently" is to be understood, in particular, that the sealing modules comprise differing numbers, differing sizes and/or differing arrangements of cable pass-through channels. In particular, different sealing modules have an at least substantially identical exterior basis shape. In particular, the cable pass-through sealing unit is provided to be able to receive different sealing modules in a same position. In particular, a high level of flexibility is achievable. In particular, the cable contact weather protection device may be flexibly adapted to different cable configurations.

It is further proposed that at least one, in particular at least a majority, preferably each of the sealing modules comprises precisely one sealing element. In particular, saving of components and/or an easy assembly may be achieved. As an alternative, it is conceivable that at least a portion, in particular each of the sealing modules comprises a plurality of sealing elements.

It is moreover proposed that at least one, in particular at least a majority, preferably each of the sealing modules is provided to be unfolded for a cable assembly, in particular for inserting cables into cable pass-through channels of the sealing module. In particular, the cable pass-through channels are embodied such that they are slotted on at least one side. In particular, a hinge of the sealing modules, which allows the unfolding, is arranged at an exterior side that faces the housing unit in at least one usage state. In particular, both the sealing element and the at least one sheathing element comprise at least one hinge. In particular, the at least one sheathing element comprises a mechanism, in particular a latching and/or clamping mechanism, which is provided for avoiding an inadvertent unfolding of the sealing module. Advantageously the sealing element is at least substantially slotted along a circumferential direction. A "circumferential direction" is to be understood, in particular, as an extension direction that is at least substantially parallel to an extension of a closest wall of the housing unit. In particular, a slotting extends along a circumferential direction on the one hand up to a lateral limitation of the sealing element, which is in particular at least substantially perpendicular to an extension of a closest wall of the housing unit, on the other hand up to shortly before a limitation of the sealing element, and at this point takes a turn towards the exterior side to form a hinge. In particular, a slotting is continued into the at least one sheathing element. In particular, an easy assembly can be achieved.

Furthermore it is proposed that sealing elements of the sealing modules are embodied as gel elements. A "gel element" is to be understood, in particular, as an element having a soft pouch, which is dimensionally stable at least under a slight load and is filled with a viscous, at least gel-like material. In particular, the pouch and the material therein contained are embodied by an identical material, the viscous, gel-like material being transferred into a solid state at interfaces forming the pouch by means of a chemical and/or physical process. In particular, the sealing elements are implemented by at least one polymer, in particular a block copolymer SEBS, and/or by a thermoplastic polymer, e.g. polyurethane. In particular, a high compressibility and/or a high sealing capacity may be achieved. As an alternative, it is conceivable, for example, that a sealing element is implemented by a gas-filled, preferably flexible pouch.

It is advantageously proposed that at least one, in particular at least a major part, preferably each of the sealing modules is embodied at least substantially as an annulus sector. In particular, the sealing modules of a cable pass-through sealing unit together complete an annulus. In particular, the sealing modules have an annulus ring sector-like contour, at least seen from above, in particular from the hollow space. In particular, the sealing modules, in particular their respective sealing elements, touch each other laterally. As an alternative, it is conceivable that dividing walls are arranged between the sealing modules respectively the sealing elements of different sealing modules. In particular, a simple construction is achievable. In particular, a space-saving arrangement is achievable.

Furthermore it is proposed that the sealing modules respectively comprise latching elements for a latching assembly. In particular, the latching elements are arranged on at least one of the sheathing elements. In particular, the sealing module carrier comprises corresponding latching elements, which are provided to latch with the latching elements of the sealing modules. It is in particular conceivable that the sealing module carrier and/or the sealing modules, in particular the sheathing elements, comprise guiding elements, in particular grooves and/or webs, which simplify an assembly of the sealing modules and/or improve a hold of the sealing modules. In particular, a connection can be achieved that is easily manufacturable, easily releasable, easy to maintenance and/or stable.

It is also proposed that the cable contact weather protection device comprises a cable fixation unit having at least two, in particular at least four, advantageously no less than six, preferably no less than eight separate cable fixation modules, each of which is provided to fixate at least one elongate body, in at least one usage state. In particular, respectively one of the cable fixation modules is allocated to one of the sealing modules, the cable fixation modules and sealing modules that are allocated to each other being arranged in a shared cable pass-through region. In particular, the allocated cable fixation modules are implemented equivalent with respect to number and/or size of cables that are to be inserted. A "cable fixation module" is to be understood, in particular, as a structural unit that is exchangeable for a cable fixation module of the same or of another construction type. By "separate" cable fixation modules, in particular, cable fixation modules comprising no shared structural elements are to be understood. In particular, the cable fixation modules respectively comprise at least one first clamping unit for clamping the elongate body. Preferentially the cable fixation modules comprise at least one second clamping unit for clamping a cable component of the elongate body or for clamping a cable component of a cable guided through the elongate body, in particular a cable shielding, preferably a cable stabilization. In particular, a tension relief of inserted cables is achievable, which facilitates in particular a cable contacting.

Advantageously it is proposed that at least one of the cable fixation modules comprises a guiding element determining a minimum bending radius for lines of inserted cables. In particular, the guiding element extends tongue-like from a clamping unit, in particular from a first clamping unit. In particular, the guiding element comprises fixation means, which allow a fixation of lines of inserted cables at the guiding element. In particular, a secure assembly can be achieved. In particular, assembly errors may be avoided.

Furthermore it is proposed that the cable fixation unit comprises a support unit, which is provided to movably support the cable fixation modules. In particular, the support unit is provided for a latching assembly. In particular, the support unit comprises guiding elements, in particular guiding pins. In particular, the cable fixation module comprises guiding elements, in particular a guiding plate, provided to guide the cable fixation module at the guiding elements of the support unit. In particular, the cable fixation module comprises at least one guiding element, in particular a groove, which is provided to act together with a guiding means, in particular a plate edge, of the support unit to the purpose of achieving a positive-fit guidance of the cable fixation module. In particular, the cable fixation module comprises at least one movement restriction element, in particular a latching element, which is provided to restrict a movement clearance of the cable fixation module.

Furthermore a system for composing a cable contact weather protection device according to the invention is proposed. This system advantageously comprises at least two, in particular no less than three, advantageously at least four different sealing modules, which are provided to be combined to a cable pass-through sealing unit of the cable contact weather protection device, and/or the system comprises at least two, advantageously no less than three, preferably no less than four different cable fixation modules, which are provided to be composed to a cable fixation unit. Advantageously the system comprises for each of the cable fixation modules a functionally allocated sealing module. In particular, a high flexibility is achievable.

DRAWINGS

Further advantages may be gathered from the following description of the drawings. In the drawings an exemplary embodiment of the invention is shown. The drawings, the description and the claims contain a plurality of features in combination. The person having ordinary skill in the art will expediently also consider the features separately and will further combine them in a purposeful manner.

It is shown in.

DESCRIPTION OF THE EXEMPLARY EMBODIMENT

Figure 1:
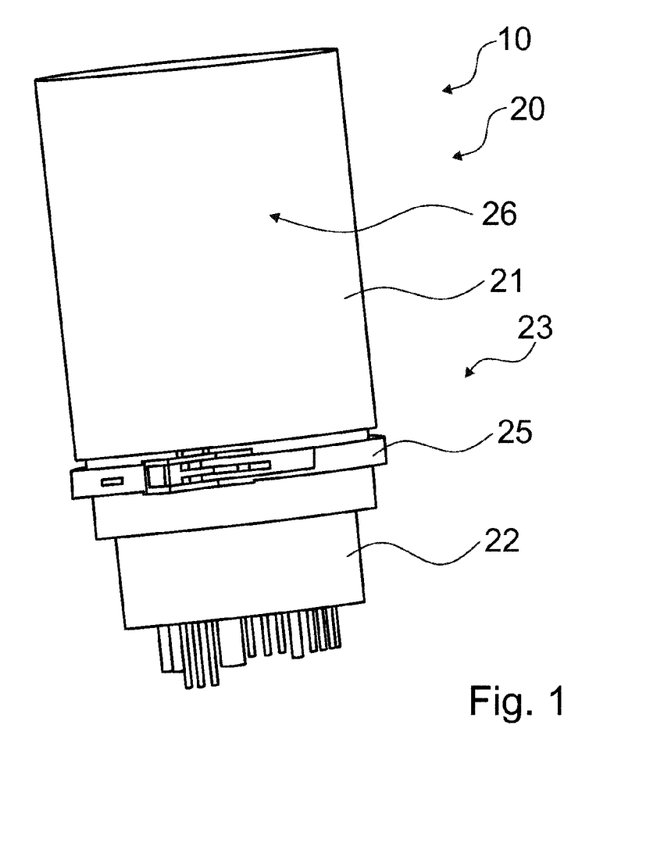
FIG. 1 a cable contact weather protection device according to the invention in an exterior view in a closed state, FIG. 2 a partial sectional view through a cable contact device according to the invention, FIG. 3 a perspective view of a partially disassembled cable pass-through sealing unit, FIG. 4 a first sealing element according to the invention of a first sealing module according to the invention in an unfolded state, in a view from above, FIG. 5 a second sealing module according to the invention in a perspective view, FIG. 6 a sealing element of the second sealing module according to the invention in a view from below, FIG. 7 the sealing element of the first sealing module according to the invention in a view from above, FIG. 8 a sealing element of a third sealing module according to the invention in a view from above, FIG. 9 the cable contact weather protection device and its cable fixation unit viewed obliquely from above without a housing unit, FIG. 10 a first cable fixation module in a disassembled depiction with an inserted cable, FIG. 11 the first cable fixation module in a connected state, FIG. 12 a second cable fixation module in a disassembled state, and FIG. 13 a third cable fixation module in a disassembled state.
Figure 2:
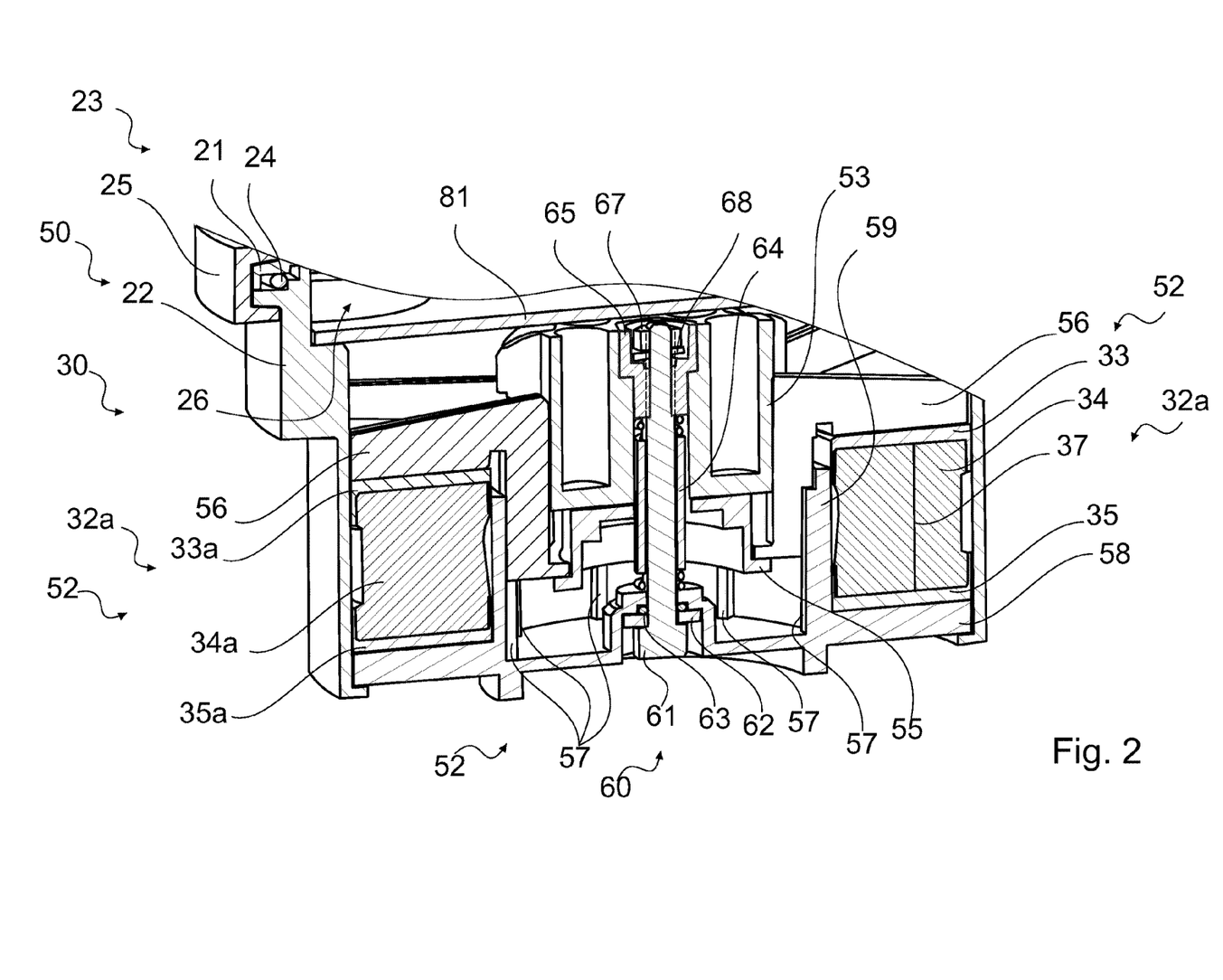

FIG. 1 shows a cable contact weather protection device 10 for receiving fiber optic cable contact points (a depiction of individual lines of cables and a denomination of the cables guided into the cable contact weather protection device 10 has been dispensed with in the figures, with few exceptions, to keep up an appropriate clarity). The cable contact weather protection device 10 comprises a housing unit 20. The housing unit 20 comprises a substantially cylindrical cover part 21 and a staggeredly cylindrical base part 22. The cover part 21 has one single opening. The base part 22 comprises a top and a bottom opening. The housing unit 20 further comprises a sealing unit 23, which is formed by a sealing ring 24 and a clamping ring 25 (FIG. 2). The sealing unit 23 is provided to connect the cover part 21 and the base part 22 with each other by means of the clamping ring 25, wherein the opening of the cover part 21 and the top opening of the base part 22 are situated upon each other. The sealing ring 24 is arranged between the cover part 21 and the base part 22. The sealing ring 24 surrounds the opening of the cover part 21 and the top opening of the base part 22. The sealing ring 24 seals off a gap between the cover part 21 and the base part 22. The housing unit 20 forms a hollow space 26. Cables connected in the hollow space 26 are guided through the bottom opening of the base part 22.

Figure 3:
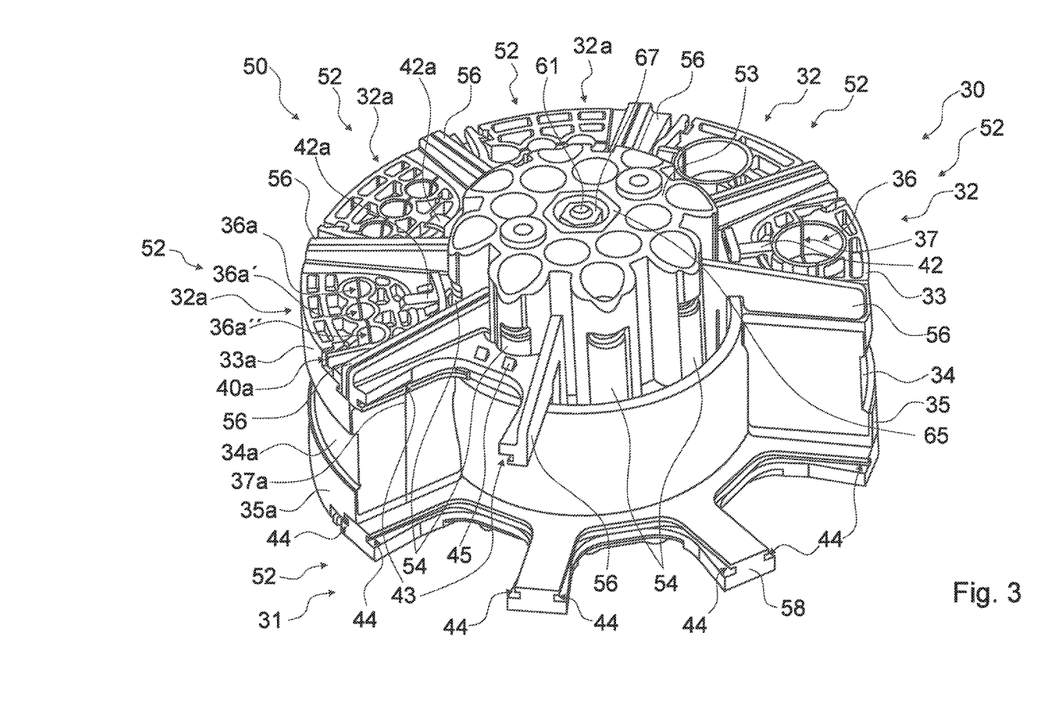

The cable contact weather protection device 10 comprises a cable pass-through sealing unit 30, which is arranged in a space that is encompassed by the base part 22. The cable pass-through sealing unit 30 comprises eight separate sealing modules 32, 32a, which are exchangeable independently from each other (FIG. 3; a double denomination of re-appearing components has been substantially dispensed with for keeping up a better clarity. Furthermore, not all sealing modules 32, 32a are depicted in FIG. 3.). The sealing modules 32, 32a are inserted in a sealing module carrier 31. The cable pass-through sealing unit 30 comprises four first sealing modules 32 and four second sealing modules 32a. The first and second sealing modules 32, 32a are embodied differently. Each of the first sealing modules 32 is in a usage state provided to respectively receive an elongate body with a medium or large diameter and to sectionally completely encompass it in a circumferential direction. To this purpose the first sealing modules 32 respectively comprise a cable pass-through channel 36. The second sealing modules 32a are in a usage state provided to respectively receive three elongate bodies of a small to medium diameter and to sectionally completely encompass these in a circumferential direction. To this purpose the second sealing modules 32a each comprise three cable pass-through channels 36a, 36a', 36a". Each of the sealing modules 32, 32a comprises precisely one sealing element 34, 34a and two sheathing elements 33, 35, 33a, 35a adjacent to the sealing element 34, 34a. The sheathing elements 33, 35, 33a, 35a are respectively arranged at the respective sealing element 34, 34a on a side facing the hollow space 26 and on a side facing away from the hollow space 26. The sheathing elements 33, 35, 33a, 35a are formed of a solid plastic, e.g. polyethylene.

The sealing elements 34, 34a are respectively embodied as gel elements. The sealing modules 32, 32a are substantially embodied as annulus sectors. The sealing modules 32, 32a respectively extend over an angle of 45°. The sealing modules 32, 32a, when mounted into the sealing module carrier 31, together complete an annulus. The sheathing elements 33, 35, 33a, 35a respectively cover in a mounted state one side of the sealing elements 34, 34a facing the hollow space 26 and one side of the sealing elements 34, 34a facing away from the hollow space 26. The sheathing elements 33, 35, 33a, 35a further cover, respectively starting from the covered sides, a stripe of an exterior side of the sealing element 34, 34a, which in a mounted state faces the housing unit 20, and a stripe of an interior side of the sealing element 34, 34s, facing away from the housing unit 20. The stripes of the sheathing elements 33, 35, 33a, 35a herein respectively cover one portion each, in particular approximately 20%, of the exterior respectively interior side of the sealing element 34, 34a. On the exterior side of the sealing element 34, 34a, a non-covered region of the sealing element 34, 34a is respectively indented inward such that it is offset in parallel by a few millimeters. On the interior side of the sealing element 34, 34a, a non-covered region of the sealing element 34, 34a is indented towards the sealing element 34, 34a in a slightly club-shaped manner. Sector-limit sides of the sealing elements 34, 34a, which are oriented substantially perpendicularly with respect to the interior and exterior sides, are free of a covering by the sheathing elements 33, 35, 33a, 35a. Sector-limit sides of the sealing elements 34, 34a abut sector-limit sides of other sealing elements 34, 34a in an assembled state.

Figure 4:
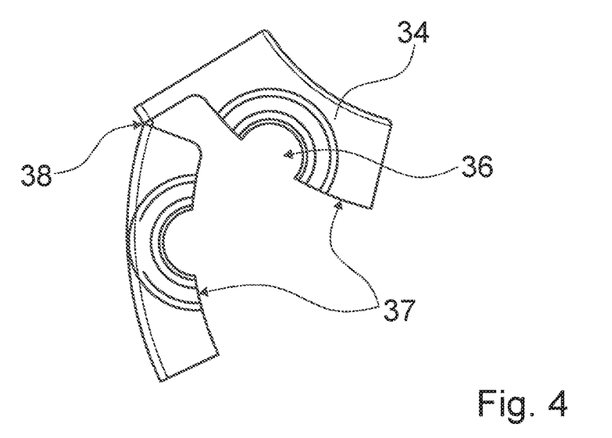
Figure 5:
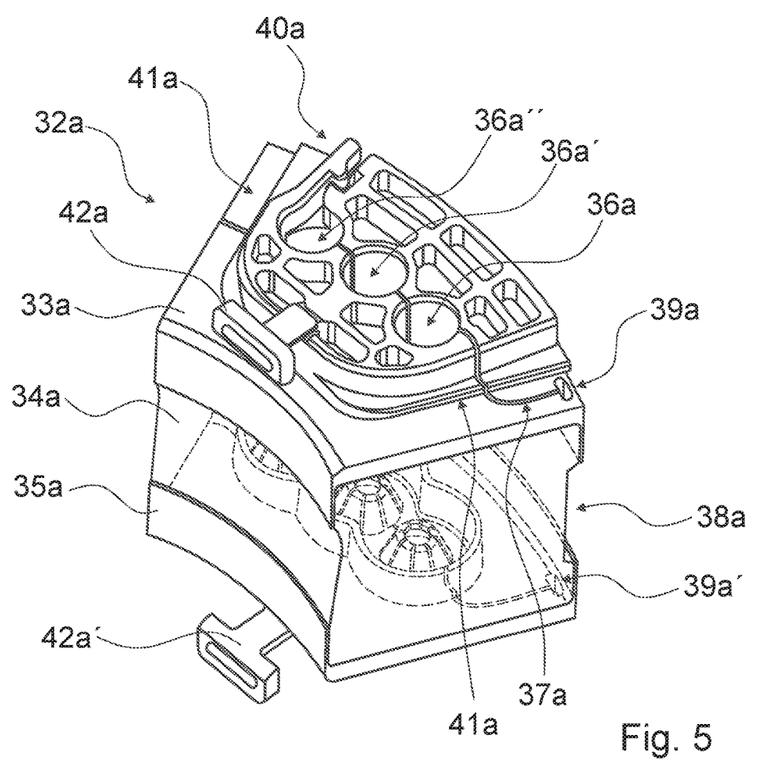
Figure 6:
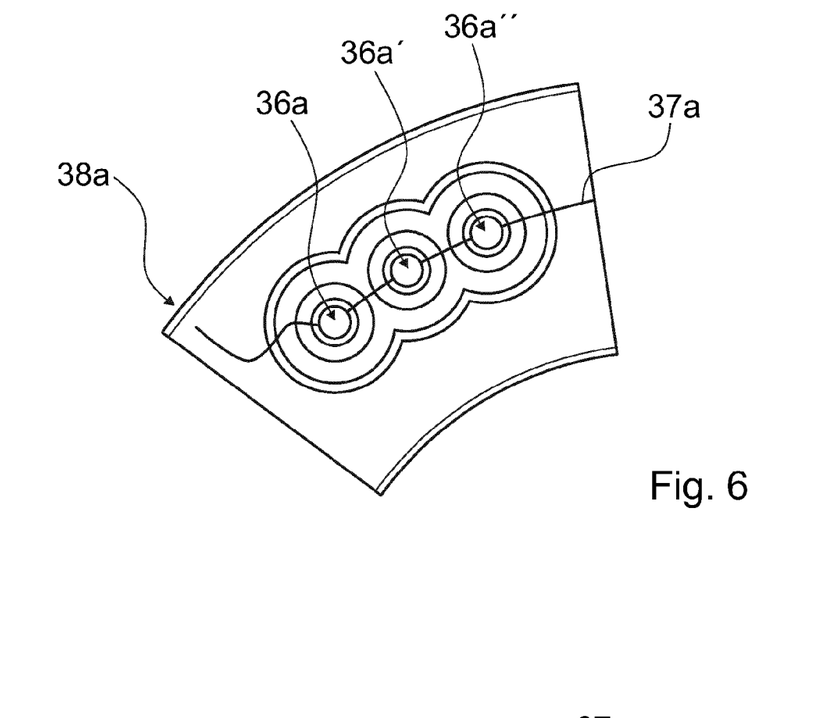
Figure 7:
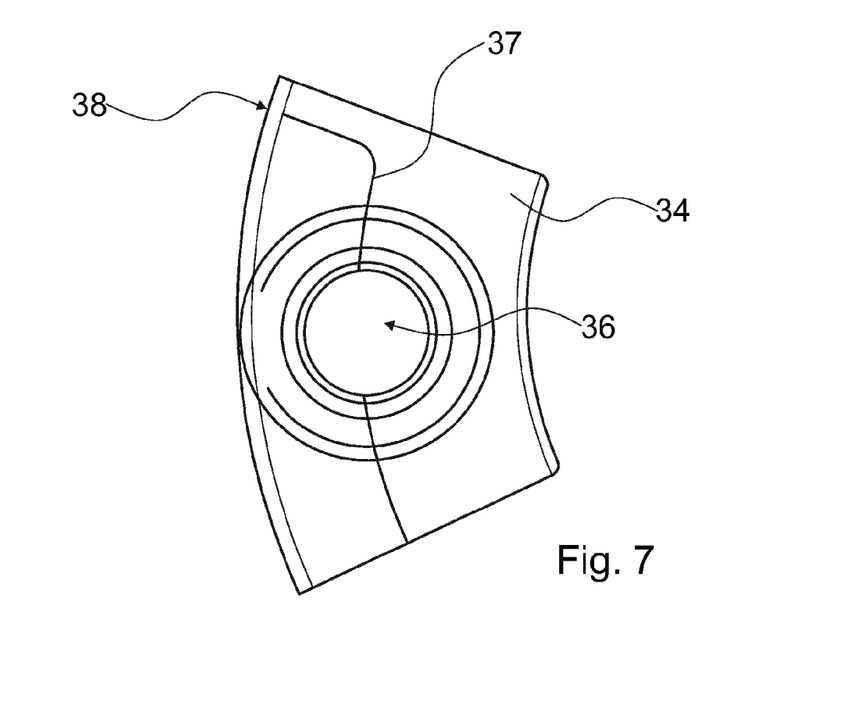

The sealing modules 32, 32a are provided to be unfolded for a cable assembly (FIG. 4). To this purpose the sealing elements 34, 34a and the sheathing elements 33, 35, 33a, 35a are partially slotted along a circumferential direction (FIGS. 5 to 8). A slot 37, 37a through sealing element 34, 34a and sheathing elements 33, 35, 33a, 35a herein starts from a first sector-limit side, cuts through cable pass-through channels 36, 36a, 36a', 36a" approximately centrally respectively and continues toward the exterior side near the second sector-limit side. The slot 37, 37a herein respectively ends shortly before reaching the exterior side. At the point where the slot 37, 37a has almost reached the exterior side of the sealing element 34, 34a, a hinge 38, 38a is formed, which allows an unfolding of the sealing element 34, 34a. The sheathing elements 33, 35, 33a, 35a each comprise in a comparable place a hinge 39a, 39a' embodied as a living hinge. The hinges 38, 38a, 39a, 39a' of the sheathing elements 33, 35, 33a, 35a and of the sealing element 34, 34a are situated in one axis. The sheathing elements 33, 35, 33a, 35a each comprise on a side facing away from the hinge 39a, 39a' a latching mechanism 40a, which is provided to avoid an inadvertent unfolding of the sealing module 32, 32a.

Figure 8:
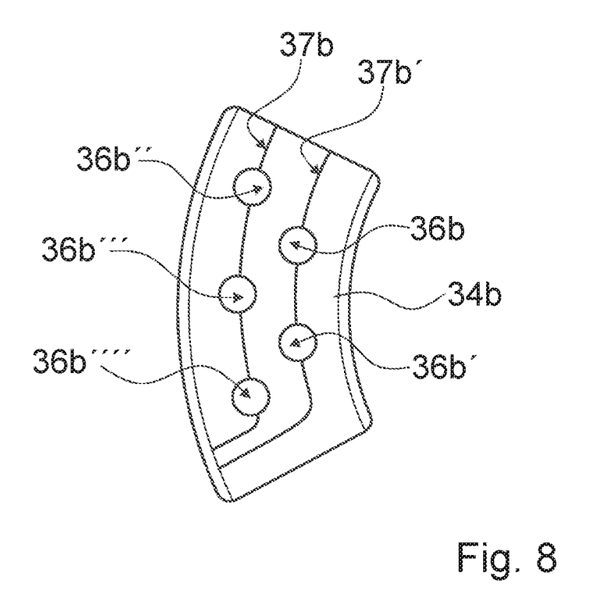

Further implementations of sealing modules, in particular with cable pass-through channels in different sizes and/or different numbers, are conceivable. In FIG. 8 a sealing element 34b of a third sealing module is shown as an example. The sealing element 34b comprises five cable pass-through channels 36b, 36b', 36b", 36b"', 36b"". The cable pass-through channels 36b, 36b', 36b", 36b"', 36b"" are arranged in two rows, one first slot 37b cutting through three of the cable pass-through channels 36b", 36b"', 36b"" and a second slot 37b' cutting through two of the cable pass-through channels 36b, 36b'. Further implementations with, for example, two, four, six, seven and more, in particular up to sixteen cable pass-through channels and/or even with three or four rows and a corresponding number of slots extending in particular in a circumferential direction are conceivable.

The cable contact weather protection device 10 further comprises a pressurizing unit 50, which is provided to charge the sealing modules 32, 32a with a pressure in a direction parallel to the cable pass-through channels 36b, 36a, 36a', 36a" (FIG. 3). The pressurizing unit 50 comprises a respective separate pressurizing module 52 for each of the sealing modules 32, 32a of the cable pass-through sealing unit 30. Each of the pressurizing modules 52 comprises its respective tension force unit 54 and its respective actuating body 56. The tension force unit 54 is respectively implemented by an in particular long-cylindrical spiral spring component. The pressurizing modules 52 share a pressure base 58.

The sealing module carrier 31 is implemented by the adjusting bodies 56 and the shared pressure base 58. The sealing modules 32, 32a form, at a side of the sheathing elements 33, 35, 33a, 35a that faces away from the sealing element 34, 34a, guiding elements 41a, which are embodied respectively as guiding grooves and guiding webs. The adjusting bodies 56 each comprise guiding elements 43 embodied as guiding webs and guiding grooves, which are provided to implement a positive fit with the guiding elements 41a of the sheathing element 33, 33a that faces toward the hollow space 26. The shared pressure base 58 comprises guiding elements 44 embodied as guiding webs and guiding grooves, which are provided to implement a positive fit with the guiding elements 41a of the sheathing element 35, 35a that faces away from the hollow space 26. Further the sealing modules 32, 32a respectively comprise two latching elements 42, 42a, 42a', which are embodied as T-hooks. The latching elements 42, 42a, 42a' are respectively arranged at an interior side such that they protrude over the respective sheathing elements 33, 35, 33a, 35a and are molded at said sheathing elements 33, 35, 33a, 35a. The adjusting bodies 56 and the pressure base 58 each comprise, at an interior end of recesses, latching elements 45 implemented as ramps, behind which the latching elements 42, 42a, 42a' of the sealing modules 32, 32a latch in assembly. The latching elements 45 of the adjusting bodies 56 respectively face towards the hollow space 26. The latching elements 45 of the pressure base 58 respectively face away from the hollow space 26. Between the recesses of the adjusting bodies 56 and the respective recess of the pressure base 58, a respective cable pass-through region is formed, in which a sealing module 32, 32a is inserted in an assembled state. The latching elements 42, 42a, 42a' of the sealing modules 32, 32a each comprise an auxiliary lug allowing for a release of the latch connection, e.g. by way of a tip of a screwdriver.

Different sealing modules 32, 32a respectively comprise an identical basic shape, such that the guiding elements 41a and the latching elements 42, 42a, 42a' are respectively arranged in equivalent positions, as a result of which the sealing module carrier 31 comprises standardized receptacles, resulting in a simplified and flexible assembly and in exchangeable sealing modules 32, 32a.

The pressurizing unit 50 comprises a pressure adjusting unit 51, which is provided to simultaneously adjust a pressure for all pressurizing modules 52. The pressure adjusting unit 51 comprises a main actuating body 53. The tension force units 54 of the respective pressurizing modules 52 are respectively tensioned between the main actuating body 53 and the respective actuating body 56. The pressure adjusting unit 51 moreover comprises a distance piece 55, which is firmly connected to the main actuating body 53 and which determines, together with the main actuating body 53, a minimum and a maximum displacement distance of the adjusting bodies 56 with respect to the main actuating body 53. The main actuating body 53 and the distance piece 55 form a hollow, into which respectively one projection of the actuating body 56 engages and along which the projection is restricted in its freedom of movement. The main actuating body 53 comprises stop edges which are provided to restrict a movement clearance of the adjusting bodies 56, in particular toward the hollow space 26. The distance piece 55 comprises stop edges which are provided to restrict a movement clearance of the adjusting bodies 56, in particular in a direction away from the hollow space 26. In this way on the one hand a secure relief of the sealing modules 32, 32a can be achieved in at least one state, on the other hand in at least one further state a non-suspended direct load can be achieved, and a suspended load can be achieved in intermediary states. The pressure base 58 is embodied substantially plate-like with a hollow cylinder 59 mounted on top. The hollow cylinder 59 has an exterior diameter corresponding to approximately half of a diameter of the pressure base 58. The sealing modules 32, 32a abut, in an assembled state, at an exterior side of the hollow cylinder 59 with their interior sides. The hollow cylinder 59 comprises at its interior side, in a longitudinal direction of the hollow cylinder 59, guiding webs 57 which guide the adjusting bodies 56 in their lifting movement. Furthermore, the adjusting bodies 56 are guided between the interior wall of the hollow cylinder 59 and an exterior wall of the main actuating body 53. Due to the pressurizing, the sealing modules 32, 32a are compressed and are deformed at least in a middle region. The sealing elements 34, 34a are compressed between the sheathing elements 33, 35, 33a, 35a. An exterior side of the sealing element 34, 34a is herein pressed outwards against the housing unit 20. An interior side of the sealing element 34, 34a is pressed inwards against a wall of the hollow cylinder 59 of the pressure base 58. Walls of the cable pass-through channel 36, 36a, 36a', 36a" formed by the sealing element 34, 34a are pressed toward each other, wherein a diameter of the cable pass-through channel 36, 36a, 36a', 36a" is compressed to up to 50% or even 30% of its original diameter. The cable pass-through sealing unit 30 seals off the housing unit 20 against the pressure base 58 in a usage state.

The pressure adjusting unit 51 further comprises an operating unit 60. The operating unit 60 is provided to adjust a distance between the pressure base 58 and the main actuating body 53. The operating unit 60 comprises an operating element 61 embodied as a long screw. The operating element 61 is guided through a hole in the pressure base 58 that is arranged in a hollow, and is spaced apart from the pressure base 59 by means of a washer 62. A head of the operating element 61 is arranged in the hollow that leads to the hole, which may also serve to avoid an inadvertent relief. Between the washer 62 and the pressure base 58 a sealing ring 63 is arranged in a further hollow of the pressure base 58, adjacent to the operating element 61, which seals off the hole in the pressure base 58. The operating unit 60 further comprises a spring unit 64, which is provided to keep the operating element 61 under a tension, to the purpose of ensuring a lifting of the pressurizing unit 50 from the sealing modules 32, 32a. The operating element 61 ends in a thread 65, which is arranged in, e.g. pressed into, the main actuating body 53. Moreover the operating unit 60 comprises a closure element 67 implemented as a nut, which is provided to avoid an unscrewing of the operating element 61 out of the thread 65. In a relieved state of the pressurizing unit 50, the closure element 67 is de-tensioned by means of a spring ring 68 counter to the thread 65 respectively to the main actuating body 53.

As an alternative, it is conceivable that a pressurizing unit according to the invention comprises a pressure adjusting unit that can be operated toollessly. In particular, in this case countersinking a head of the operating element is dispensed with. In particular, the operating element comprises a hand knob.

Figure 9:
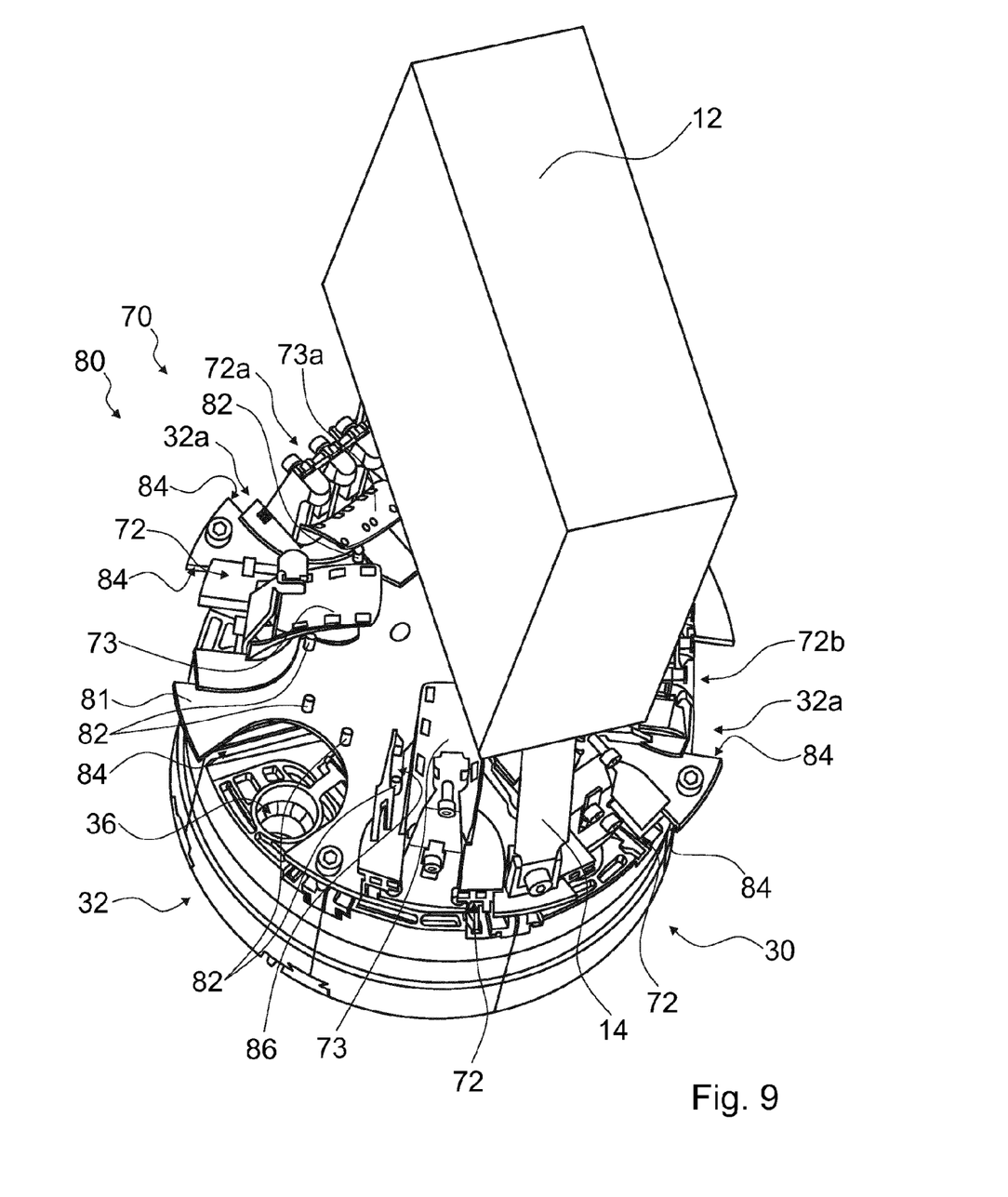

The cable contact weather protection device 10 further comprises a cable fixation unit 70 having eight separate cable fixation modules 72, 72a, 72b, each of which is provided to fixate at least one elongate body in at least one usage state (FIG. 9). The cable fixation unit 70 comprises four first cable fixation modules 72 (one of which has been taken out for the sake of a clear view of the arrangement). Furthermore the cable fixation unit 70 comprises three second cable fixation modules 72a (two of which are covered). Further the cable fixation unit 70 comprises a third cable fixation module 72b. The four first cable fixation modules 72 are each provided to fixate a single cable having a medium to large diameter. Respectively one of the first sealing modules 32 is arranged correspondingly and allocated to each of the first cable fixation modules 72. The three second cable fixation modules 72a are each provided to fixate three cables having a small to medium diameter. Respectively one of the second sealing modules 32a is arranged correspondingly and allocated to each of the second cable fixation modules 72a. The third cable fixation module 72b is provided to fixate three sparger tubes for a subsequent cable laying. One of the second sealing modules 32a is allocated to the third cable fixation module 72b. The cable fixation modules 72, 72a, 72b each comprise a guiding element 73, 73a, 73b, 73b', 73b", which determines a minimum bending radius for lines of inserted cables. The guiding elements 73, 73a, 73b, 73b', 73b" respectively determine a minimum bending radius to approximately 4 cm and in particular prevent a kinking of the lines. The guiding elements 73, 73a, 73b, 73b', 73b" each comprise holes which are provided to fixate lines of inserted cables to the guiding element 73, 73a, 73b, 73b', 73b" by means of cable ties.

The cable fixation unit 70 comprises a support unit 80, which is provided to movably support the cable fixation modules 72, 72a, 72b. The support unit 80 comprises a base plate 81. The base plate 81 is firmly connected, in this case screwed, to the main actuating body 53. The support unit 80 further comprises guiding elements 82, which are embodied as guiding pins. Furthermore the support unit 80 comprises guiding elements 84, which are embodied as peripheral edges and are arranged at recesses for receiving the cable fixation modules 72, 72a, 72b. The recesses for receiving the cable fixation modules 72, 72a, 72b are herein embodied identically shaped to allow any desired assembly of the cable fixation modules 72, 72a, 72b.

The base plate 81 is moreover screwed to the base part 22. At the base plate 81 a connection arrangement 12 is fastened for supporting cable connection points between lines of inserted cables. The connection arrangement 12 is spaced apart from the base plate 81 by means of a bridge carrier 14.

The cable fixation modules 72, 72a, 72b each comprise guiding elements 74, 74a, 74b embodied as grooves, which are provided to be guided at the guiding elements 84 when the cable fixation modules 72, 72a, 72b are received in the support unit 80 (FIGS. 10-13). The cable fixation modules 72, 72a, 72b each comprise a guiding plate 75, 75a, 75b, which is provided to be guided between the guiding elements 82 of the support unit 80. The cable fixation modules 72, 72a, 72b each comprise a latching mechanism 76, 76a, 76b, which is provided to latch around one of the guiding elements 82 of the support unit 80. The latching mechanism 76, 76a, 76b and the guiding plate 75, 75a, 75b encompass an elongate guiding channel 86, which is substantially closed and which receives as well as guides one respective guiding element 82 (FIG. 9). Due to the guiding element 82 being guided in the guiding channel 86, the respective cable fixation module 72, 72a, 72b can be shifted by approximately 2 cm without fixated cables being released, which is sufficient for exchanging the respective sealing module 32, 32a for a sealing module 32, 32a of the same kind, e.g. because of aging or deficiency.

The different cable fixation modules 72, 72a, 72b are exchangeable for each other as regards their fastening at the support unit 80.

Figure 10:
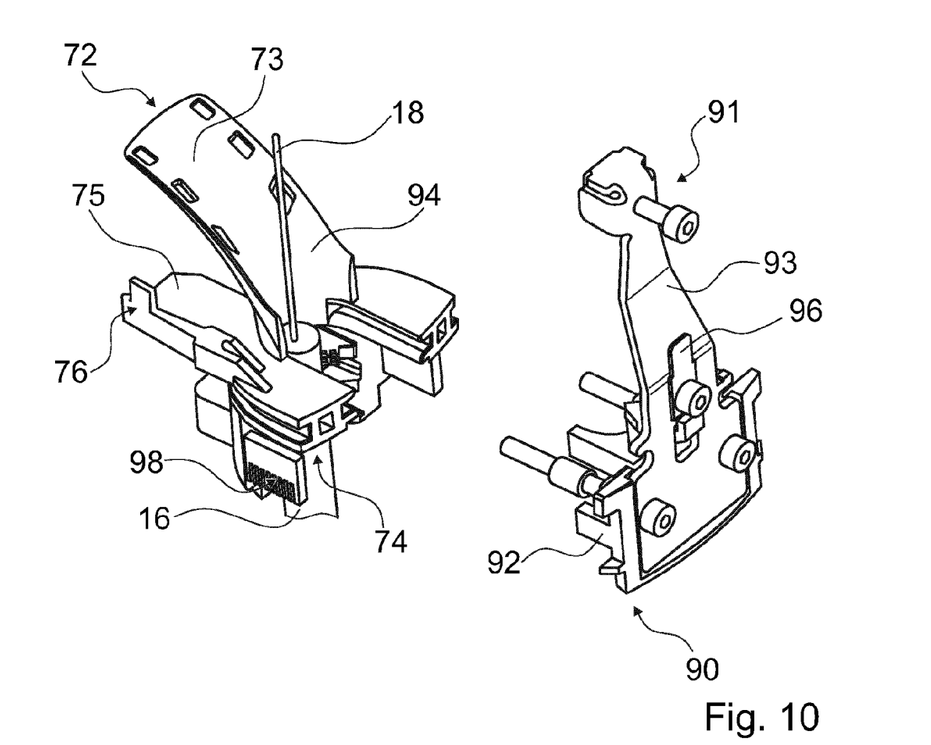
Figure 11:
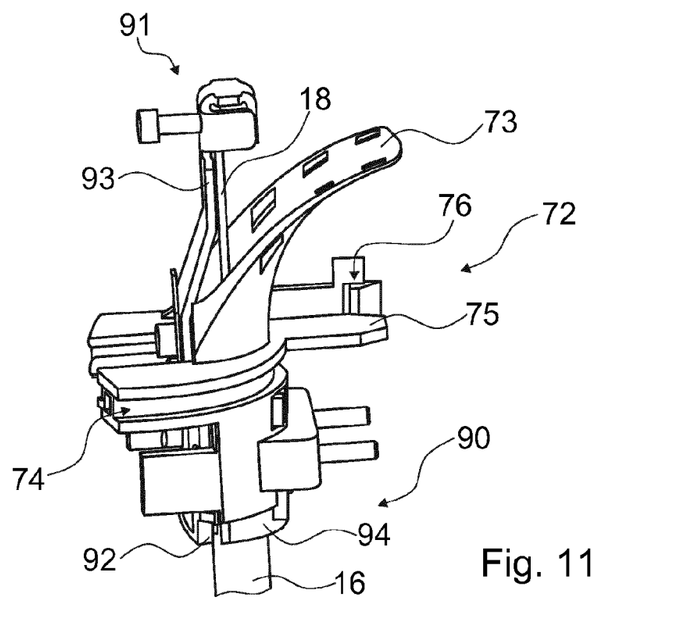

The first cable fixation module 72 comprises a first clamping unit 90, which is provided to clamp an entire fiber optic cable 16 (FIGS. 10, 11). The clamping unit 90 is formed by two clamping jaws 92, 94, between which the fiber optic cable 16 is arranged for fixation, the clamping jaws 92, 94 clamping the fiber optic cable 16 by means of a screw fastening.

The clamping jaws 92, 94 have a shingling to the purpose of achieving an improved hold of the fiber optic cable 16. The first clamping unit 90 further comprises a tension force controlling unit 98, which is provided to facilitate for a user adjusting a clamping force at the first clamping unit 90, by which the fiber optic cable 16 is fixated. The tension force controlling unit 98 is implemented by a scale, in particular a mm scale. The tension force controlling unit 98 is implemented at the second clamping jaw 94. The tension force controlling unit 98 shows a distance between the two clamping jaws 92, 94. The first clamping jaw 92 uncovers, in dependency on a position, a differing number of slots of the comb scale. In cable assembly, an operator can put the clamping jaws 92, 94 together so far that an inserted cable is just clamped. The operator can then read a position of the clamping jaws 92, 94 with respect to each other. By way of comparing positions read, in a further clamping, i.e. moving the clamping jaws 92, 94 towards each other, the operator can deduct a tension force exerted, or can directly compare to suggested clamping forces. As an alternative, an implementation of the tension force controlling unit is conceivable by at least one spring element, which then drives a display mechanism.

The first cable fixation module 72 comprises a second clamping unit 91, which is provided to clamp fast a central element 18 of the undone fiber optic cable 16, the fiber optic lines of the fiber optic cable 16 being in a normal case arranged around the central element 18. The central element 18 is herein provided for stabilizing and ensuring a minimum bending radius. The separate fixation of the central element 18 results in increased safety and in a high level of traction relief and/or pressure relief. The second clamping unit 91 comprises a metal holding 93, at which the central element 18 is fixated by means of screw clamping, as a result of which in particular a traction relief and pressure relief is achievable. Moreover a grounding of a metal central element 18 is achievable. The guiding element 73 is arranged at the second clamping jaw 94. The metal holding 93 and thus the second clamping unit 91 are arranged at the first clamping jaw 92. At the metal holding 93 a clamping contact 96 is arranged, which is provided for assembly of an electric shielding line.

Figure 12:
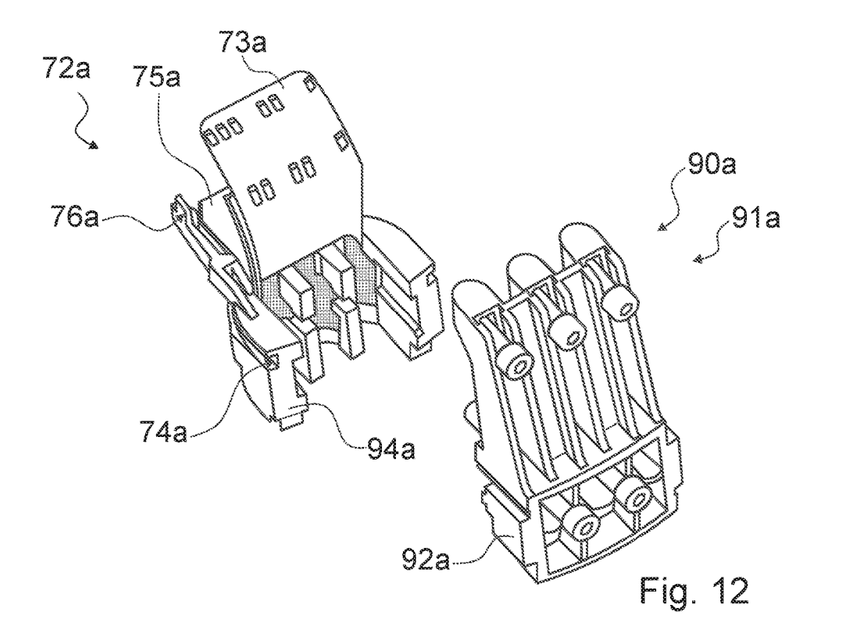

The second cable fixation module 72a comprises a first clamping unit 90a, which is provided to clamp three entire cables together (FIG. 12). The first clamping unit 90a is embodied by two clamping jaws 92a, 94a, between which the cables are arranged in guiding regions for a fixation, the clamping jaws 92a, 94a clamping the cables by means of a screw fastening. The clamping jaws 92a, 94a have a shingling to the purpose of achieving an improved hold of the cable. The second cable fixation module 72a comprises a second clamping unit 91a, which is provided to clamp fast a central element of the undone cable. The second clamping unit 91a is embodied at the first clamping jaw 92a and is provided for a screw clamping. The guiding element 73a is arranged at the second clamping jaw 94a.

Figure 13:
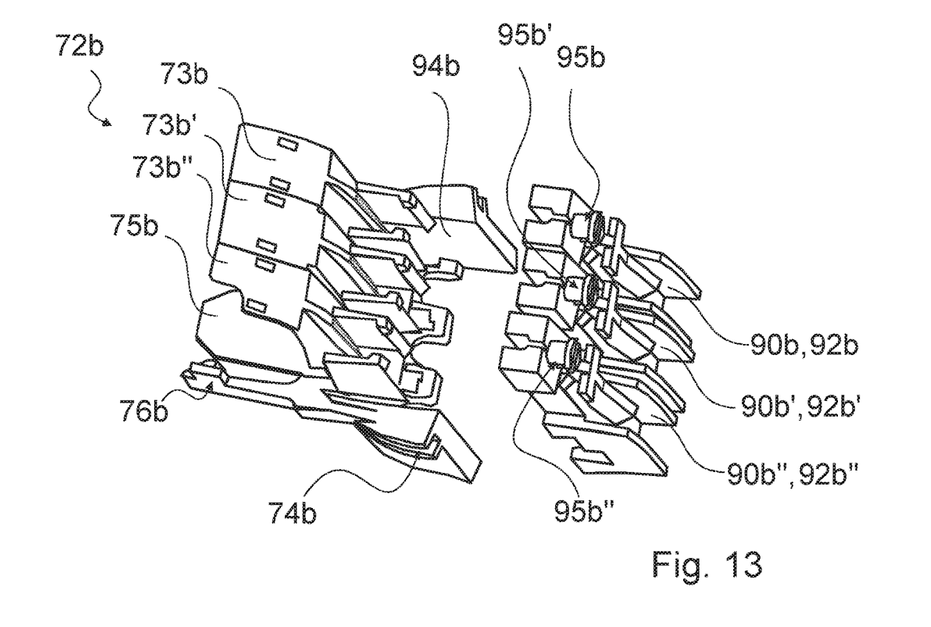

The third cable fixation module 72b comprises three first clamping units 90b, 90b', 90b", which are each provided to clamp a sparger tube for subsequently introducing a fiber optic line (FIG. 13). The first clamping units 90b, 90b', 90b" are embodied by two clamping jaws 92b, 92b', 92b", 94b, between which the sparger tubes are arranged in guiding regions for a fixation, the first clamping jaws 92b, 92b', 92b" each being individually fastened to the second clamping jaw 94b by means of a latching connection, to the purpose of clamping the sparger tubes. The clamping jaws 92b, 92b', 92b", 94b have a shingling for achieving an improved hold of the cable. The third cable fixation module 72b comprises three fixation units 95b, 95b', 95b", which are each provided to receive and to fasten a shelling and/or protecting element of a fiber optic line injected through the sparger tube by way of winding up and clamping fast. The guiding element 73b is arranged at the second clamping jaw 94b.

The support unit 80, the pressurizing unit 50 and the housing unit 20 are preferably manufactured from metal work materials. The further components are preferably made substantially of plastic materials.

By means of the described implementation, furthermore a system for composing a cable contact weather protection device 10 according to the invention is disclosed, the system comprising different sealing modules 32, 32a, which are provided to be combined into a cable pass-through sealing unit 30 of the cable contact weather protection device 10, and comprising different cable fixation modules 72, 72a, 72b, which are provided to be composed to a cable fixation unit 70 of the cable contact weather protection device 10. Each of the cable fixation modules 72, 72a, 72b herein comprises a functionally allocated sealing module 32, 32a. A system of this kind may, for example, be implemented as a construction kit, an assembly operator selecting the sealing modules 32, 32a and cable fixation modules 72, 72a, 72b he deems to be suitable for the cable configuration at hand.

REFERENCE NUMERALS 10 cable contact weather protection device
12 connection arrangement
14 bridge carrier
16 fiber optic cable
18 central element
20 housing unit
21 cover part
22 base part
23 sealing unit
24 sealing ring
25 clamping ring
26 hollow space
30 cable pass-through sealing unit
31 sealing module carrier
32 sealing module
33 sheathing element
34 sealing element
35 sheathing element
36 cable pass-through channel
37 slot
38 hinge
39 hinge
40 latch mechanism
41 guiding element
42 latch element
43 guiding element
44 guiding element
45 latch element
50 pressurizing unit
51 pressure adjusting unit
52 pressurizing module
53 main actuating body
54 tension force unit
55 distance piece
56 actuating body
57 guiding web
58 pressure base
59 hollow cylinder
60 operating unit
61 operating element
62 washer
63 sealing ring
64 spring unit
65 thread
67 closure element
68 spring ring
70 cable fixation unit
72 cable fixation module
73 guiding element
74 guiding element
75 guiding plate
76 latching mechanism
80 support unit
81 base plate
82 guiding element
84 guiding element
86 guiding channel
90 clamping unit
91 clamping unit
92 clamping jaw
93 hold
94 clamping jaw
95 fixation unit
96 clamping contact
98 tension force controlling unit

The invention claimed is:

1. A cable contact weather protection device for receiving cable contact points, in particular of fiber optic cable contact points, comprising:
at least one cable pass-through sealing unit comprising at least two separate sealing modules that contact each other laterally, that are exchangeable independently from each other, and that each of which is provided to at least sectionally completely encompass, in at least one usage state, at least one elongate body in a circumferential direction, and
a pressurizing unit that is provided to charge the sealing modules with a pressure in at least one direction and that comprises at least one pressure adjusting unit provided to simultaneously adjust a pressure for at least a majority of the pressurizing modules.

2. A cable contact weather protection device for receiving cable contact points, in particular of fiber optic cable contact points, comprising:
at least one cable pass-through sealing unit comprising at least two separate sealing modules that contact each other laterally, that are exchangeable independently from each other, and that each of which is provided to at least sectionally completely encompass, in at least one usage state, at least one elongate body in a circumferential direction, wherein
at least one of the sealing modules is embodied at least substantially as an annulus sector.

3. The cable contact weather protection device according to claim 1, wherein the pressurizing unit comprises for at least a majority of the sealing modules of the cable pass-through sealing unit respectively one separate pressurizing module.

4. The cable contact weather protection device according to claim 3, wherein the pressurizing unit comprises at least one pressure adjusting unit, which is provided to simultaneously adjust a pressure for at least a majority of the pressurizing modules.

5. The cable contact weather protection device according to claim 1, wherein at least two of the sealing modules are embodied differently.

6. A system for composing a cable contact weather protection device for receiving cable contact points, in particular of fiber optic cable contact points, comprising:
at least one cable pass-through sealing unit comprising different sealing modules provided to be combined into a cable pass-through sealing unit that includes at least two separate sealing modules that contact each other laterally, that are exchangeable independently from each other, and that each of which is provided to at least sectionally completely encompass, in at least one usage state, at least one elongate body in a circumferential direction.

7. The cable contact weather protection device according to claim 1, wherein at least one of the sealing modules is provided to be unfolded for a cable assembly.

8. The cable contact weather protection device at least according to claim 1, wherein the sealing element is at least substantially slotted along a circumferential direction.

9. The cable contact weather protection device according to claim 1, wherein sealing elements of the sealing modules are embodied as gel elements.

10. The cable contact weather protection device according to claim 1, wherein at least one of the sealing modules is embodied at least substantially as an annulus sector.

11. The cable contact weather protection device according to claim 1, wherein each of the sealing modules comprises at least one sheathing element formed of a solid plastic.

12. The cable contact weather protection device according to claim 1, comprising a cable fixation unit having at least two separate cable fixation modules, each of which is provided to fixate at least one elongate body, in at least one usage state.

13. The cable contact weather protection device according to claim 1, wherein the sealing modules are disconnectable, connectable, and exchangeable with respect to the cable pass-through sealing unit individually and independently from each other.

14. The cable contact weather protection device at least according to claim 12, wherein the cable fixation unit comprises a support unit, which is provided to movably support the cable fixation modules.

15. A system for composing a cable contact weather protection device according to claim 1.

16. The system according to claim 15, comprising different sealing modules, which are provided to be combined into a cable pass-through sealing unit of the cable contact weather protection device.

17. The system according to claim 16, wherein each of the cable fixation modules comprises a functionally allocated sealing module.

18. A sealing module of a cable contact weather protection device according to claim 1.

19. A cable fixation module of a cable contact weather protection device according to claim 1.

20. The cable contact weather protection device according to claim 1, wherein the cable pass-through sealing unit comprises at least one sealing surface that is adjacent to a structural element of the housing unit in at least one usage state.

* * * * *